United States Patent [19]

Jennings et al.

[11] Patent Number: 5,448,873
[45] Date of Patent: Sep. 12, 1995

[54] NET KNIFE FOR ROUND BALER

[75] Inventors: Richard E. Jennings, Lancaster; Edwin O. Margerum, Paradise, both of Pa.

[73] Assignee: New Holland North America, Inc., New Holland, Pa.

[21] Appl. No.: 13,842

[22] Filed: Feb. 5, 1993

[51] Int. Cl.$^6$ .................... B65B 27/12; B65B 63/04
[52] U.S. Cl. ...................... 53/118; 53/587; 53/389.3; 83/697; 83/835
[58] Field of Search ............ 53/587, 211, 556, 381.2, 53/389.3; 83/697, 835, 838, 847

[56] References Cited

U.S. PATENT DOCUMENTS

| | | | |
|---|---|---|---|
| 306,850 | 10/1884 | Miller | 83/838 |
| 3,277,764 | 10/1966 | Henc | 83/697 X |
| 3,866,491 | 2/1975 | Marchard | 83/697 X |
| 4,407,113 | 10/1983 | Core . | |
| 4,409,784 | 10/1983 | VanGinhoven et al. . | |
| 4,597,241 | 7/1986 | Clostermeyer et al. . | |
| 4,599,844 | 7/1986 | Clostermeyer et al. . | |
| 4,604,855 | 8/1986 | Krone et al. . | |
| 4,608,896 | 9/1986 | Topp | 83/697 X |
| 4,754,677 | 7/1988 | McKindary | 83/697 |
| 4,787,193 | 11/1988 | Verhulst et al. . | |
| 4,922,690 | 5/1990 | Gusewell et al. . | |
| 4,956,968 | 9/1990 | Underhill . | |

*Primary Examiner*—Linda Johnson
*Attorney, Agent, or Firm*—Frank A. Seemar; Larry W. Miller

[57] ABSTRACT

An agricultural baler for making cylindrical bales of crop material having a sledge assembly moveable between bale starting and full bale positions. The sledge assembly includes a plurality of rollers which cooperate with an array of belts to define a bale forming chamber. A dispensing mechanism is provided for dispensing web material, such as net or the like, into the bale forming chamber whereupon it is wrapped circumferentially around a cylindrical package of crop material in the bale forming chamber. Included along the path of the net prior to being fed into the chamber is a severing assembly for cutting the net after it has been wrapped around the cylindrical hay package formed in the chamber. The net severing assembly includes a unique severing element that provides improved net cutting.

7 Claims, 5 Drawing Sheets

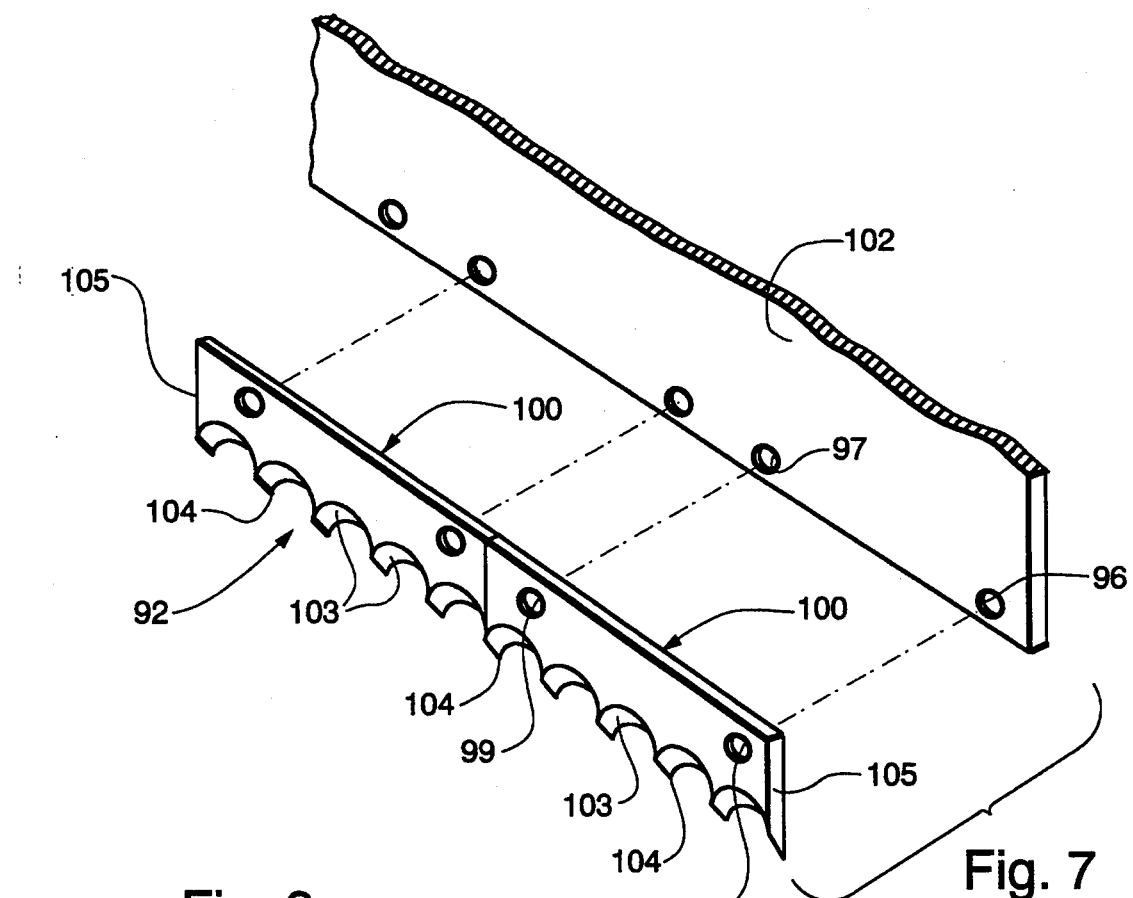
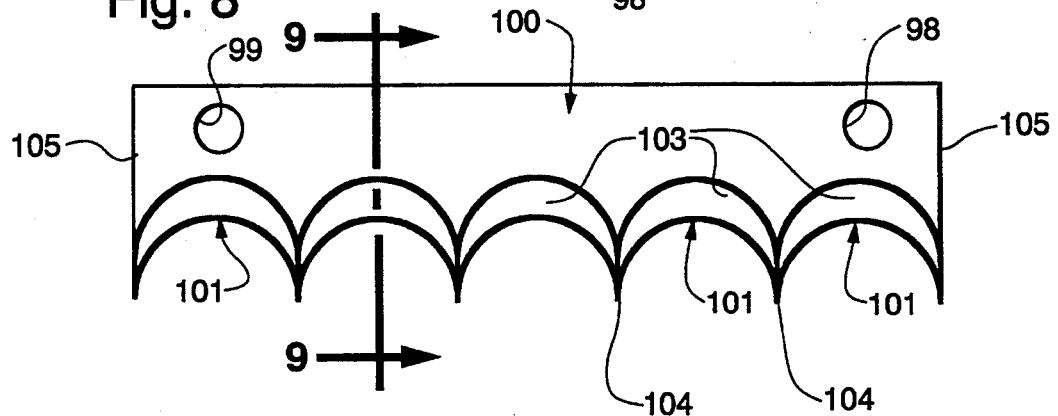
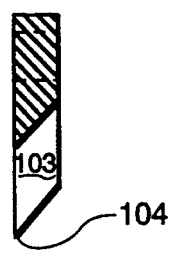

NET KNIFE FOR ROUND BALER

FIELD OF THE INVENTION

This invention relates generally to a baler for forming cylindrical bales of crop material, commonly referred to as a round baler. More particularly, this invention pertains to improved net severing apparatus for round balers in which cylindrical packages of crop material are wrapped with a continuous web of net material.

BACKGROUND OF THE INVENTION

Round balers generally have a bale forming chamber defined by an apron comprising an array of side-by-side belts, transverse slats trained on chains, a plurality of rolls or a combination of these various elements, e.g., rolls and belts. Crop material, such as hay, is picked up from the ground, as the baler travels across the field, and is fed into a fixed or expandable chamber where it is rolled up to form a compact cylindrical hay package. While still inside the bale forming chamber in its compacted form, the outer surface of the package is wrapped with twine or web material, such as net, prior to ejecting the wrapped bale from the chamber onto the ground for subsequent handling.

Exemplary of round balers of the general type mentioned above is the baler disclosed in U.S. Pat. No. 4,956,968 issued in the name of K. R. Underhill on Sep. 18, 1990. In this baler an apron consisting of a combination of rolls and belts is used for bale formation. The baler also includes a mechanism for supplying net to a dispensing assembly which in turn feeds the net material into the bale forming chamber for circumferentially wrapping a formed cylindrical package of crop material. The dispensing mechanism includes a net insertion arrangement having a grasping portion for pulling net from the supply mechanism and inserting the free edge, commonly referred to as the tail, into the chamber. Subsequent to wrapping, the net material is severed by a cutting device, comprising an assembly for thrusting a knife transversely through the path of the net causing a severing action as the net is pulled against the edge of the knife.

In other round balers known in the art, various cutting devices are employed as exemplified by the apparatus disclosed in U.S. Pat. No. 4,597,241, issued Jul. 1, 1986, wherein a pair of opposing knives are used to shear the web material. In another known arrangement a knife strikes an anvil to provide the severing function as depicted in U.S. Pat. No. 4,922,690, issued May 8, 1990. Still another prior art mechanism contemplates a knife that is projected into a recess on the opposite side of the web path to urge the web against a cutting abutment, as shown in U.S. Pat. No. 4,599,844, issued Jul. 15, 1986.

Insofar as the severing element used in round balers is concerned, there are also different types used. In addition to the straight knife edge referred to above, other known means include a serrated knife edge as disclosed in U.S. Pat. No. 4,409,784, issued Oct. 18, 1983. Cutting devices in round baler wrapping systems have also been known to utilize a series of side-by-side triangular shaped knife elements projected into the path of the web material. This latter arrangement is embodied in the round baler apparatus disclosed in U.S. Pat. No. 4,604,855 and No. 4,407,113, issued Aug. 12, 1986, and Oct. 4, 1983, respectively.

In a copending application, assigned to a common assignee, filed Aug. 14, 1992, Ser. No. 07/929,357, for NET SEVERING APPARATUS FOR ROUND BALER, a unique combination of comb and knife edge is disclosed, showing yet another known net severing arrangement.

The web wrapping material used in round balers is another factor having a bearing on the net severing assembly. Materials vary from a thin film of plastic to numerous types of net. One of the most commonly known net materials used in round balers is a woven fabric material, as shown by way of example in U.S. Pat. No. 4,569,439, issued Feb. 11, 1986 and No. 4,570,789, issued Feb. 18, 1986. A second equally as common net material used is made from extruded plastic, an example of which is disclosed in U.S. Pat. No. 4,781,291, issued Nov. 1, 1988.

During the general process of making a round bale, as discussed above, the package of hay becomes formed and wrapped by a continuous web of material while still in the bale forming chamber. At this stage in the process it is important that severing of the net take place trouble free and that a substantially straight lateral edge is left on the end of the web that remains in the baler to enhance initiation of the next wrapping cycle. A straight lateral cut is also desirable from the standpoint of the bale that is being discharged to provide a snugly wrapped neat bale that facilitates handling. In some instances in the past, problems have been encountered when the woven net is improperly severed due to, e.g., bunching or sideways movement of the net at or prior to impact. Not only is the poor appearance and uneven end undesirable but a straggly end can be more readily snagged during processing of the next bale or handling of the discharged bale. Further, problems have also arisen in some attempts to provide a cutting means that is adaptable to effectively sever woven net as well as extruded net, both of which have different physical characteristics.

SUMMARY OF THE INVENTION

An important object of the present invention is to provide improved net severing apparatus for round balers that solves the above problems while still providing a cost effective device that lends itself to ease of serviceability.

In pursuance of this and other important objects the present invention provides for a round baler having a chamber in which cylindrical packages of crop material are formed into bales, means for feeding the crop material into the chamber, means for rotating the cylindrical hay package, means for supplying net along a predetermined path, means for dispensing the supplied net into the bale chamber for circumferentially wrapping a cylindrical hay package during rotation in the chamber, a severing assembly adapted to cause severing of the net after it has been wrapped around the package to form a bale, and the severing assembly comprises a unique cutting element for transversely severing the net. According to its broadest aspects the present invention contemplates a cutting element adapted to cause severing of net after it has been wrapped around the package to form a bale, wherein the cutting element includes a knife having a cutting edge with a series of arcuate blade portions. More particularly the knife includes in a more limited sense a plurality of substantially identical side-by-side scalloped shaped sections, wherein adjacent scalloped shaped sections meet at a series of apexes.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 7 is a diagrammatic exploded view showing the principal elements of the severing assembly of the present invention.

FIG. 8 is a partial side elevational view of the elements of the severing assembly shown in FIG. 7.

FIG. 9 is a view taken in the direction of arrows 9—9 in FIG. 8.

DESCRIPTION OF THE PREFERRED EMBODIMENT

Figure 1:
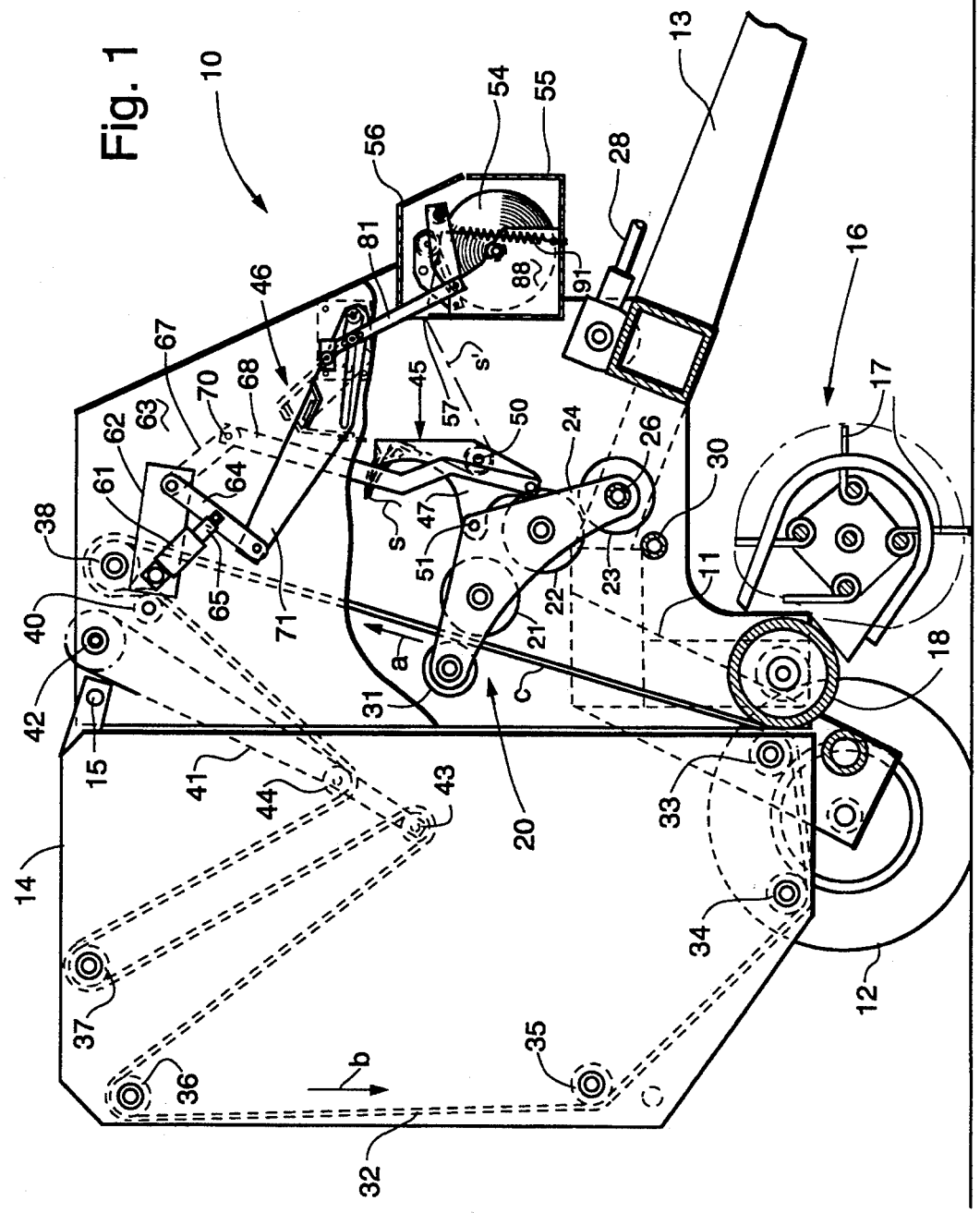
FIG. 1, a diagrammatic side elevational view of a round baler in which the present invention is embodied, shows the elements of the baler in the bale starting position.

Referring now to the drawings for a more detailed description of the preferred embodiment of the invention, FIG. 1 shows a round baler 10 of the type having an expandable chamber defined by belts and rollers, as generally disclosed in U.S. Pat. No. 4,956,958.

Figure 2:
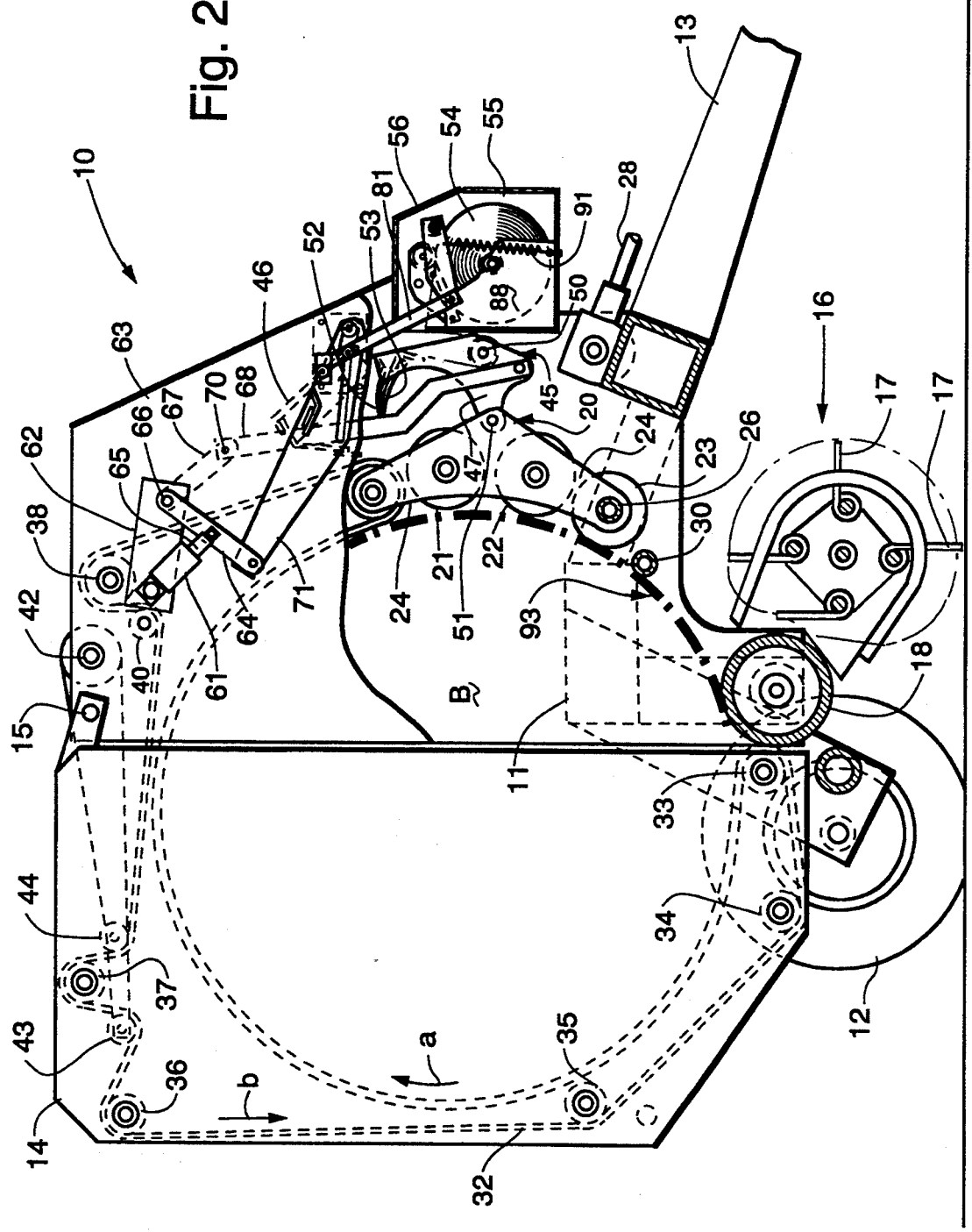
FIG. 2, a diagrammatic side elevational view similar to FIG. 1, shows the elements of the baler in the full bale position.

Round baler 10, which incorporates the preferred embodiment of the present invention, includes a main frame 11 supported by a pair of wheels 12 (only one shown). A tongue 13 is provided on the forward portion of main frame 11 for connection to a tractor. Pivotally connected to the sides of main frame 11 by a pair of stub shafts 15 is tailgate 14 which may be closed (as shown in FIGS. 1 and 2) during bale formation or pivoted open about stub shafts 15 to discharge a completed bale. A conventional pickup 16, mounted on main frame 11, is supported by a pair of suitable wheels (not shown). Pickup 16 includes a plurality of fingers or tines 17 movable in a predetermined path to lift crop material from the ground and deliver it rearwardly toward a floor roll 18, rotatably mounted on main frame 11.

Figure 3:
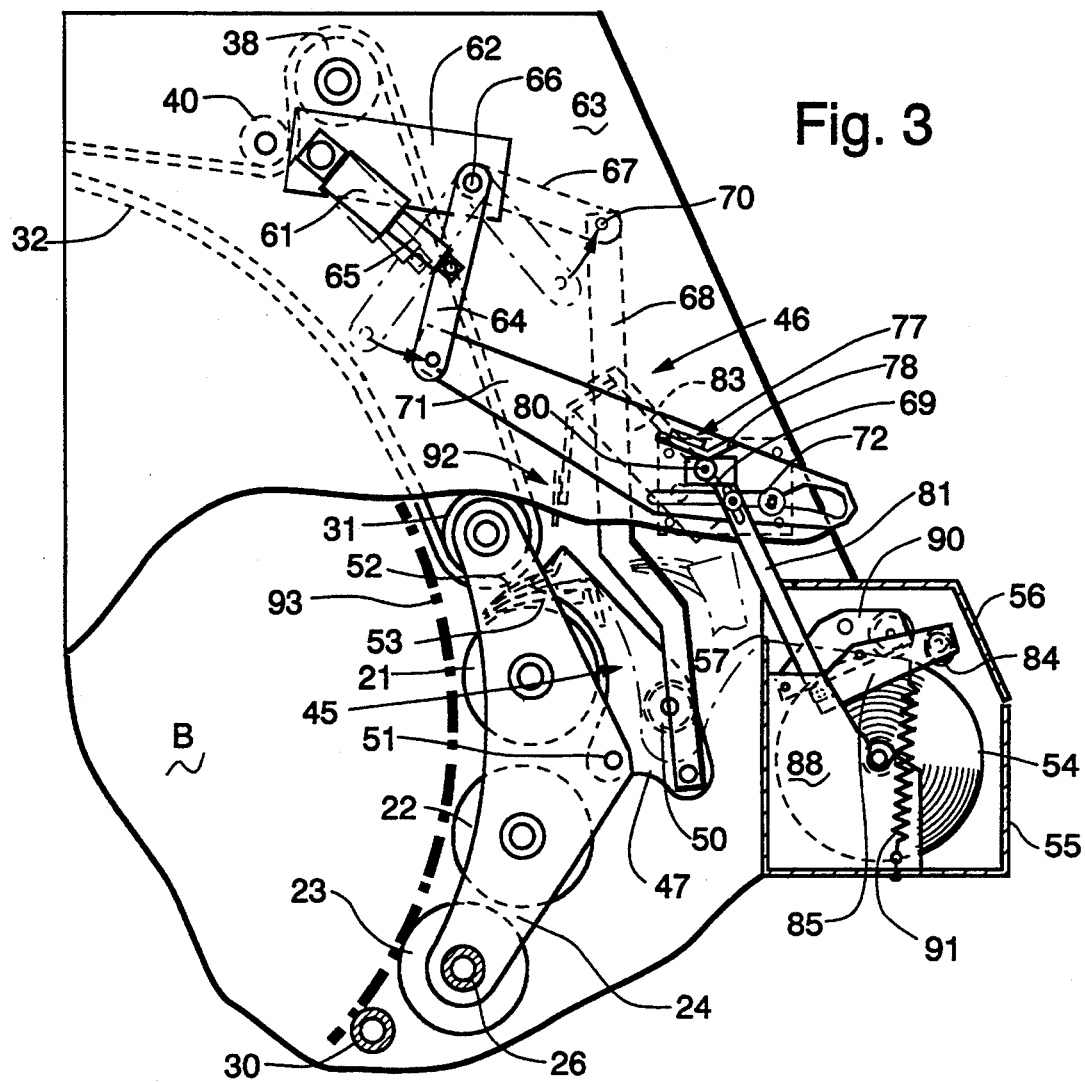
FIG. 3 is a detailed side elevation of the net wrapping apparatus of the baler shown in FIGS. 1 and 2.

The bale forming chamber is defined partly by a sledge assembly 20 comprising a plurality of rollers 21, 22, 23 extending transversely of the main frame 11 in the arcuate arrangement seen in FIG. 1–3. Rollers 21, 22, 23 are journalled at their respective ends in a pair of spaced apart roll carrying arms 24, pivotally mounted inside main frame 11 on stub shafts 26 for providing movement of sledge assembly 20 between the bale starting position shown in FIG. 1 and the full bale position shown in FIG. 2. Rollers 21, 22, 23 are driven in a counterclockwise direction by conventional means (for example, chains and sprockets or gears) connected with a drive shaft 28. A starter roll 30 is located adjacent roller 23 and is also driven counter-clockwise. A freely rotatable idler roller 31, also carried by arms 24, moves in an arcuate path with sledge assembly 20.

The bale forming chamber is further defined by a conventional apron 32 comprising a plurality of continuous side-by-side belts supported by guide rolls 33, 34, 35, 36, 37 which are rotatably mounted in tailgate 14. Apron 32 is also supported on a drive roll 38, rotatably mounted on main frame 11. Although apron 32 passes between roller 21 and idler roller 31, it is only in engagement with idler roller 31 and not roller 21 which is located in close proximity to the apron belts and serves the purpose of striping crop material from the belts, in addition to its bale forming function. Suitable coupling means (not shown) connected to drive shaft 28 provide rotation of drive roll 38 in a direction indicated generally by arrows a and b in FIGS. 1 and 2. An additional guide roll 40 ensures proper driving engagement between apron 32 and drive roll 38. A pair of take up arms 41 are pivotally mounted on main frame 11 by a cross shaft 42 for movement between inner and outer positions shown in FIGS. 1 and 2, respectively. Take up arms 41 carry additional guide rolls 43, 44 for supporting apron 32. Resilient means such as coil springs (not shown) are provided to normally urge take up arms 41 toward their inner positions.

When the elements of round baler 10 are disposed in the condition shown in FIG. 1 with tailage 14 closed, an inner course c of apron 32 extends between lower front guide roll 33 and idler roll 31. Rollers 21, 22, 23 in this condition are inclined rearwardly on sledge assembly 20 to define with course c the initial bale forming chamber, or as sometimes referred to, the core starting chamber. Apron inner course c forms the rear wall of the chamber while the inwardly facing peripheral surfaces of rollers 21, 22, 23 define in a general manner rearwardly inclined cooperating front wall. Floor roll 18 and starter roller 30, spaced from floor roll 18, provide a throat or inlet for the chamber.

As round baler 10 is towed across a field, pickup tines 17 lift crop material from the ground and deliver it through the inlet to the chamber. The crop material is carried rearwardly by floor roll 18 into engagement with apron inner course c (FIG. 1) which urges it upwardly and slightly forwardly into engagement with rollers 21, 22, 23. In this manner crop material is coiled in a clockwise direction to start a bale core. Continued feeding of crop material into the bale forming chamber by pickup tines 17 causes the apron inner course c to expand in length around a portion of the circumference of the bale core as the diameter increases. Take up arms 41 rotate from their inner position shown in FIG. 1 toward their outer position shown in FIG. 2 to provide for expansion of the inner course of the apron in a well known manner, i.e., in effect the outer course of the belts of apron 32 are diminished in length while the inner courses increase. After a bale has been formed and wrapped with web material, tailgate 14 is opened and the bale is ejected rearwardly. Subsequent closing of tailgate 14 returns the apron inner and outer courses of the belts of apron 32 to the locations shown in FIG. 1, and round baler 10 is ready to form another bale.

During formation of a bale, sledge assembly 20 also moves between a bale starting position (FIG. 1) to a full bale position (FIGS. 2 and 3). This movement of sledge assembly 20 causes idler roller 31 to move in an arcuate path while maintaining apron 32 in close proximity to roller 21, thereby allowing roller 21 to strip crop material from the belts of apron 32 and prevent or reduce significantly the loss of crop material between roller 31 and apron 32 during formation of a bale. Sledge assembly 20 is pushed outwardly towards its full bale position during bale formation as the crop material expands against the rollers. Subsequently it is pulled inwardly by apron 32 to the position shown in FIG. 1 without utilizing any additional mechanisms.

Now turning to the bale wrapping system with which the present invention is operative, FIG. 1 shows a net dispensing mechanism 45 pivotally mounted on sledge assembly 20 and an interrelated cutting assembly 46 pivotally mounted between the side walls 63 on main frame 11. The present invention is directed to improvements to cutting assembly 46 as will be described in detail hereinbelow. As best seen in FIG. 3, dispensing mechanism 45 comprises a pair of levers 47 spaced apart, inter alia, by a transverse idler roll 50. Levers 47 are rotatably supported on a cross tube 51 that extends between arm 24 of sledge assembly 20. Dispensing mechanism 45 further comprises transverse clamping members 52, 53 also extending between levers 47 and arranged to dispense into the forming chamber web materials (FIG. 1), such as net or the like, from a supply roll 54 disposed in a container 55 carried on baler main frame 11. Container 55 has an access lid 56 to accommodate placement or removal of supply roll 54. Clamping members 52, 53 may be mounted between levers 47 by bars such as those shown in U.S. Pat. No. 5,036,642, issued Aug. 6, 1991, which clamping structure and mounting arrangement are hereby incorporated by reference. Thus, web material s,s' is pulled from supply roll 54 via a slot 57 and guided around roller 50 to clamping members 52, 53 of dispensing mechanism 45.

Referring now to FIGS. 2 and 3, the bale wrapping system includes an electro-mechanical control system for sequentially actuating a net brake in conjunction with the net dispensing mechanism 45 as it is moved between a net feeding operative position, as shown in FIG. 3, and a nonoperative retracted position, as shown in FIGS. 1, 2 and phantom outline in FIG. 3. This control system also provides for proper actuation of the net cutting assembly 46. To this end, an electric actuator 61 is shown in its retracted position in FIGS. 1 and 2 whereas in FIG. 3 it is shown in solid lines in its extended position.

Actuator 61 is pivotally mounted to plate 62, which is affixed to the outer surface of sidewall 63. A link member 64, pivotally attached to actuator element 65, is pivoted about fixed pivot pin 66 between the retracted position and the extended position. Affixed to and adapted for rotation with pin 66 and inwardly of side wall 63 is lever 67 shown downwardly inclined in FIGS. 1 and 2 in the non-actuated position of actuator element 65. A net dispensing actuator arm 68 is pivotally connected to lever 67 via pin 70 inwardly of wall 63. Actuator arm 68 moves to the upward position shown in FIG. 3 when actuator element 65 is extended. When actuator element 65 is retracted, arm 68 is moved downwardly and net dispensing mechanism 45 is moved to the retracted non-operative position.

Figure 5:
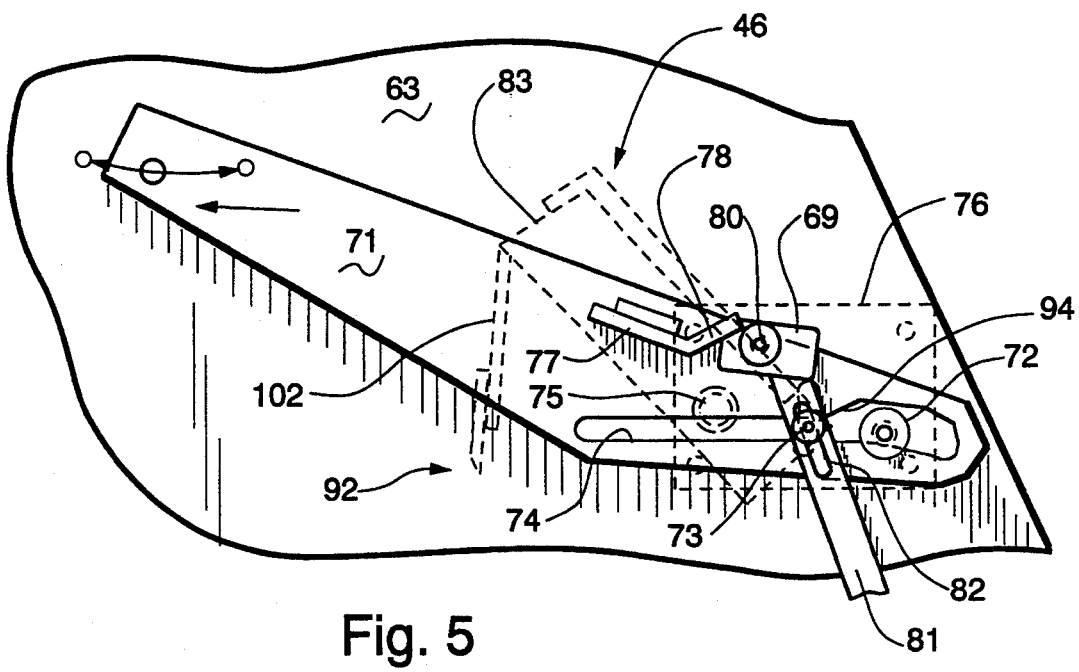
FIG. 5 is a detailed side elevational view of the control mechanism for the net wrapping apparatus of the present invention.
Figure 6:
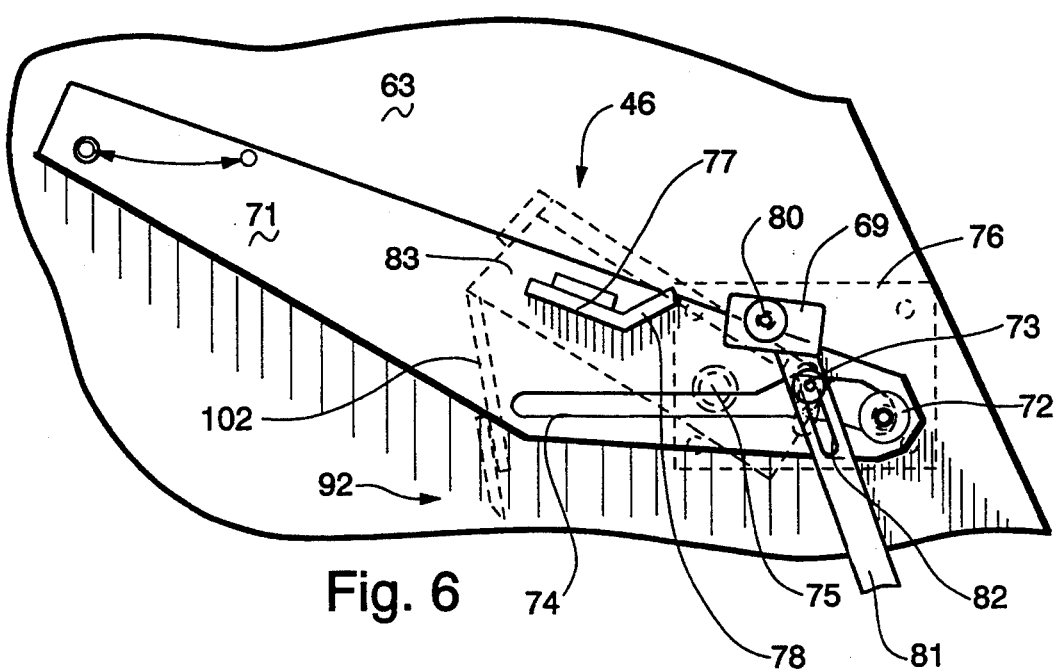
FIG. 6 is also a detailed side elevational view of the control mechanism for the net wrapping apparatus of the present invention and shows the elements in an operational position different than shown in FIG. 5.

Pivotally attached to the lower end of link member 64 is a transverse control arm 71 which reciprocates in a generally for and aft direction in response to the position of actuator element 65. The right end of control arm 71 is primarily supported by fixed flanged roller 72 and secondarily supported by knife control roller 73 (see FIGS. 5 and 6), both of which extend through control arm slot 74. FIG. 6 depicts conditions where actuator element 65 is fully retracted, and FIG. 5 shows control arm 71 and related elements in an intermediate condition. Net cutting assembly 46 pivots around a fixed pivot via a stub shaft 75 affixed to plate 76 secured to the inside surface of side wall 63.

Figure 4:
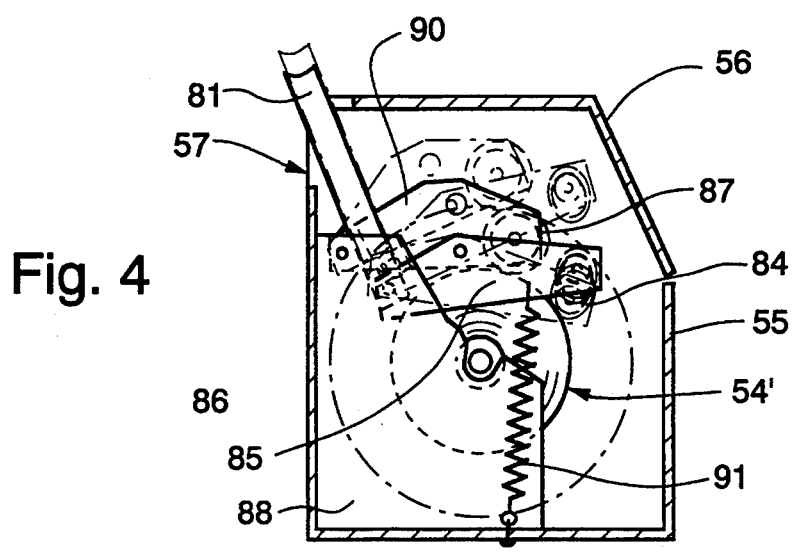
FIG. 4 is a side elevational view of the net roll supply system used in the net wrapping apparatus shown in FIG. 3.

Secured in the intermediate area of control arm 71 is a ramp element 77 having a ramp section 78 positioned to engage a roller 80 secured to a leg member 69 which is integral with net brake control arm 81. A slot 82 in brake control arm 81 cooperates with knife roller 73 which is secured to knife side plate 83. When ramp 77 slides the brake arm to its lowermost position net brake element 84 is lifted from the surface of the net supply roll by pivoting brake mounting arm 85 counterclockwise about 86 (FIG. 4). A counter roll 87 is pivotally mounted on a fixed bracket 88 via a counter roll mounting arm 90 and held in contact with the surface of net supply roll 54 by spring 91 which urges brake mounting arm 85 downwardly and in turn also urges counter roll mounting arm 90 downwardly. The number of rotations of roll 87 accurately determines the amount of net dispensed from roll 54. Thus, by counting the number of rotations of the counter roll the desired number of wraps or fractional wraps can be applied to the bale being formed.

FIG. 4, which shows the net supply assembly in general, illustrates the position of brake element 84 and counter roll 87 when the net from supply roll 54' has been partially depleted, as well as the phantom outline positions showing counter roll 87 and brake element 84 disposed adjacent the supply roll in its less depleted condition. Regardless of the size of the net supply roll or the point to which the bale forming process has progressed, the counter roll is in contact with the roll.

Now turning to net cutting assembly 46, it should be noted that it can also be referred to as a severing assembly to more generally define a mechanism capable of performing the various types of severing functions discussed above. A pair of knife side plates 83 are rotatably supported to pivot about stub shaft 75. A knife 92 is carried by and extends transversely between knife side plates 83 in a generally downward direction to pass through the path along which the net material is dispensed by dispensing mechanism 45, under conditions where the entire assembly is dropped. A similar net cutting assembly that operates in the same general manner is shown in U.S. Pat. No. 4,956,968, referred to above. For the purposes of this invention it is presumed that the cutting assembly dimensions permit knife 92 to pass through the net path a distance sufficient to assure effective severing.

FIGS. 7-9, shows the unique cutting element of severing assembly 46 in further detail and thereby depict the unique structure of the present invention. The cutting element comprises knife 92 affixed to transverse support element 102. Aligned apertures 96,97 and 98,99 facilitate the use of appropriate securing means for attaching knife 92 to element 102. More particularly, knife 92 comprises a series of side-by-side segments 100 each of which includes a continuous cutting edge 101 having a series of arcuate blade portions 103. Each blade portion is scalloped shaped and disposed side-by-side meeting at a series of like apexes 104.

The edges of each knife segment 100, referred to by reference numeral 105, have identical profiles as shown in FIG. 9. Thus, when knife segments 100 are affixed to member 102 in side-by-side fashion to form the cutting element, the edges 105 of adjacent segments are contiguous, whereupon the apexes formed thereby are identical in profile to the apexes intermediate to the ends of the knife segments. This configuration provides a continuous knife cutting edge formed by a plurality of like side-by-side scalloped shaped sections from end to end.

Before describing the specific operational advantages of the present invention, the general operation of the actuators, linkages and various other drive mechanisms and the like of baler 10, will be described. First turning to the point at which bale B has been formed and it is ready to be wrapped with net material, electric actuator 61 is activated while apron 32 continues to rotate bale B in a clockwise direction as viewed in FIG. 2. The outer surface of bale B is generally illustrated by heavy broken lines 93. Actuator element 65 of electric actuator 61 drives control arm 71 from left to right and net dispensing actuator arm 81 from the solid line position of FIG. 2 to the solid line position of FIG. 3. Dispensing mechanism 45 rotates from the position shown in FIG. 2 to position shown in FIG. 3, during which the cutting assembly 46 is rotated clockwise to the nonoperative position shown in FIG. 3 while clamping members 52, 53 move into a gap between roller 21 and apron 32. Meanwhile, net brake element 84 has been removed from the surface of supply roll 54 permitting the tail of the net material gripped between clamping members 52, 53 to be inserted into the bale forming chamber whereupon it is dragged downwardly and caught in the nip between roller 21 and bale B which are rotating in opposite directions. The net material is then dispensed along a path from the supply roll 21 via slot 57, around idler roller 50, between clamping members 52, 53, and then into the bale forming chamber where it is wrapped circumferentially around bale B while the bale continues to be rotated by apron 32. Counter roll 87 maintains light continuous contact with the surface of supply roll 54, at all times, thus permitting a minimum drag during dispensing.

After bale B has been wrapped with one or more layers of the net material, electric actuator 61 is reversed thereby retracting dispensing mechanism 45 to the position shown in FIG. 2. When dispensing mechanism 45 has been retracted, net cutting assembly 46 is rotated counterclockwise (FIG. 6) so that knife 92 is dropped downwardly at the appropriate time into contact with the expanse of net material extending from clamping members 52, 53 of dispensing mechanism 45 to the periphery of roll 21. More specifically, knife side plates 83 rotate about stub shaft 75 under conditions where knife control roller 73 slides upwardly in brake arm slot 82 upon reaching the ramp 94 in slot 74 in transverse control arm 71. Knife 92 cuts the net material and leaves a succeeding tail which is gripped by clamping members 52, 53 for future insertion into the bale forming chamber. Prior to cutting, the net brake has been actuated by control arm 81 which travels upwardly via slot 82 when ramp 78 is clear of roller 80, which actuation permits braking force to be applied on the net resulting in necessary tension during cutting.

Now turning to the unique functional aspects of the cutting element of the present invention, apexes 104 of cutting edge 101 extend initially into the path of the net material which discourages both lateral and transverse motion of the net. By virtue of its tension and the transverse mesh elements, the net is deterred from pulling over the apexes. Likewise, side-to-side bunching is discouraged by the lateral mesh elements when the apexes protrude through the mesh of the net, regardless of whether fabric or extruded net is being used. The lateral strands of the net are guided away from the apexes of the scalloped knife edge by the curvature of cutting edge 101, whereupon net tension caused by braking provides for severing in a known manner. Because of the shape of edge 101 and its engagement with the net, only a limited number of strands are urged against each arcuate blade portion between adjacent apexes 104, the strand number being determined by the actual net configuration as well as spacing between the apexes 104. This prevents the prospect of a small portion of the knife engaging a disproportionately large number of strands as would be the case if bunching were not obviated. Further, the transverse strands of the net simultaneously engage the leading surface of the knife 92 and thereby enhance the ability to sever adjacent transverse strands by uniformly hindering traversal of the net during severance.

An important advantage of the knife cutting edge configuration in which edges 105 of adjacent segments are contiguous at apexes of the cutting edge is its ability to obviate snagging to a degree that it is practically eliminated. The lateral net strands in all likelihood will not engage the point of the apexes but if they do the scalloped shape will guide them to the primary arcuate cutting surface and thereby away from the juncture between segments which depending on tolerances could be slightly separated.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A round baler having a chamber in which cylindrical packages of crop material are formed into bales, and means for feeding said crop material into said chamber,
   means for rotating said cylindrical hay package,
   means for supplying net along a predetermined path,
   means for dispensing said supplied net into said bale chamber for circumferentially wrapping a cylindrical hay package during rotation in said chamber,
   a severing assembly comprising means for severing said net after it has been wrapped around said package to form a bale, said means for severing including a cutting element for transversely severing said net, the improvement wherein:
   said cutting element comprises a knife with a continuous cutting edge having a series of arcuate blade portions comprising a plurality of substantially identical side-by-side scalloped shaped sections each with curved portions forming said continuous cutting edge, and wherein adjacent curved portions of said scalloped shaped sections meet at a series of apexes, said curved portions having a curvature such that said apexes extend initially into the path of said net sufficiently to discourage lateral motion of said net during severing.

2. In a round baler as set forth in claim 1 wherein
said cutting element further comprises a transverse support member, and
said scalloped shaped sections comprise a plurality of knife segments affixed linearly to said transverse support member.

3. In a round baler as set forth in claim 2 wherein
each of said segments is contiguous with an adjacent segment along an edge that passes through one of said apexes.

4. In a round baler as set forth in claim 1 wherein
said severing assembly includes means for mounting said cutting element adjacent said predetermined path and means for thrusting said cutting element through said path.

5. In a round baler as set forth in claim 4 wherein said knife further comprises
a series of side-by-side segments affixed in contiguous relationship, and each of said segments defining one of said scalloped shaped sections.

6. In a round baler as set forth in claim 5 wherein
said segments meet at said series of apexes, and
said apexes extend through the net during operative engagement to impede lateral and transverse motion of the net being severed.

7. In a round baler as set forth in claim 6 wherein said cutting element further comprises a transverse support member, and
said side-by-side segments are affixed linearly to said transverse support member.

* * * * *